United States Patent
Yoon et al.

(10) Patent No.: US 7,834,664 B2
(45) Date of Patent: Nov. 16, 2010

(54) SEMICONDUCTOR DEVICE FOR DETECTING A PHASE OF A CLOCK

(75) Inventors: Sang-Sic Yoon, Gyeonggi-do (KR); Kyung-Hoon Kim, Gyeonggi-do (KR)

(73) Assignee: Hynis Semiconductor Inc., Gyeonggi-do (KR)

( * ) Notice: Subject to any disclaimer, the term of this patent is extended or adjusted under 35 U.S.C. 154(b) by 64 days.

(21) Appl. No.: 12/327,112

(22) Filed: Dec. 3, 2008

(65) Prior Publication Data
US 2010/0007372 A1    Jan. 14, 2010

(30) Foreign Application Priority Data
Jul. 10, 2008    (KR) ...................... 10-2008-0067176

(51) Int. Cl.
G01R 25/00    (2006.01)
H03D 13/00    (2006.01)
(52) U.S. Cl. ................ 327/3; 327/7; 327/144; 327/145; 327/162; 327/163; 365/189.07; 365/233.1; 365/233.11; 365/233.18; 365/233.19
(58) Field of Classification Search ...... 327/2, 327/3, 5, 7–10, 12, 141, 144–146, 153–155, 327/161–163; 365/189.011, 189.07, 191, 365/233.1, 233.11–233.19, 233.5
See application file for complete search history.

(56) References Cited

U.S. PATENT DOCUMENTS

| | | | | |
|---|---|---|---|---|
| 6,985,401 B2 * | 1/2006 | Jang et al. | .................... | 365/194 |
| 7,123,524 B1 * | 10/2006 | Han | ......................... | 365/193 |
| 7,375,565 B2 * | 5/2008 | Kwak | ........................ | 327/158 |
| 7,542,358 B2 * | 6/2009 | Jang | ......................... | 365/194 |

FOREIGN PATENT DOCUMENTS

| KR | 1019980082414 A | 12/1998 |
|---|---|---|
| KR | 1020000061197 A | 10/2000 |
| KR | 1020010064117 A | 7/2001 |
| KR | 1020050089474 A | 9/2005 |

OTHER PUBLICATIONS

Notice of Preliminary Rejection issued from Korean Intellectual Property Office on Nov. 11, 2009.
Notice of Allowance issued from Korean Intellectual Property Office on Feb. 5, 2010.

* cited by examiner

Primary Examiner—Lincoln Donovan
Assistant Examiner—Patrick O'Neill
(74) Attorney, Agent, or Firm—IP & T Group LLP

(57) ABSTRACT

A semiconductor, which includes a first phase detecting unit configured to detect a phase of a second clock on the basis of a phase of a first clock, and generate a first detection signal corresponding to a result of the detection, a second phase detecting unit configured to detect a phase of a delayed clock, which is generated by delaying the second clock by a predetermined time, on the basis of the phase of the first clock, and generate a second detection signal corresponding to a result of the detection, and a logic level determining unit configured to determine a logic level of a feedback output signal according to the first detection signal, the second detection signal and the feedback output signal.

36 Claims, 6 Drawing Sheets

SEMICONDUCTOR DEVICE FOR DETECTING A PHASE OF A CLOCK

CROSS-REFERENCE TO RELATED APPLICATIONS

This application claims priority to Korean patent application number 10-2008-0067176, filed on Jul. 10, 2008, which is incorporated by reference in its entirety.

BACKGROUND OF THE INVENTION

The present subject matter relates to a semiconductor design technology, and in particular, to a clock alignment training operation, which is required in a high-speed semiconductor memory device. More particularly, the present subject matter relates to a circuit which can convert an unstable phase comparison result into a stable state and transmit the converted stable state to an external controller even though the unstable phase comparison result is caused by a noise or a jitter in a process of comparing a data clock with a system clock under clock alignment training operation.

In a system including a plurality of semiconductor memory devices, the semiconductor memory devices are used to store data. When a data processor, for example, a memory control unit (MCU) requests data, the semiconductor memory device outputs data corresponding to an address input from a device requesting data, or stores data provided from the data requesting device in a position corresponding to the address.

To this end, a high-speed memory device, which has been recently developed, is designed in order to input/output two data between the rising edge and falling edge of an external system clock and to input/output two data between the falling edge and a next rising edge of the external system clock. That is, the high-speed memory device is designed in order to input/output four data in one cycle of a system clock.

However, since the system clock is merely represented as two states, i.e., logic high or logic low, a data clock having two times faster frequency than that of the system clock is required for inputting/outputting four data during one cycle. That is, an exclusive clock for the input/output of data is required.

Accordingly, when an address and a command are received/transmitted, the high-speed semiconductor memory device uses the system clock as a reference clock. When data are inputted/outputted, the high-speed semiconductor memory device performs controls in order for the data clock to have a frequency two times higher than that of the system clock using the data clock as the reference clock.

That is, the high-speed semiconductor memory device repeats two cycles of the data clock in one cycle of the system clock, and inputs/outputs data at rising and falling edges of the data clock respectively. Therefore, the high-speed semiconductor memory device can input/output four data during one cycle of the system clock.

In this way, the high-speed semiconductor memory device exchanges data using two clocks having different frequencies for performing a read or write operation, as opposed to a conventional Double Data Rate (DDR) synchronous memory device which uses one system clock as a reference clock for performing a read or write operation.

However, in a case where a phase of the system clock and a phase of the data clock are not aligned, a reference for transferring an operation command and an address is not aligned with a reference for transferring data. This denotes that the high-speed semiconductor memory device cannot normally operate.

Therefore, to normally operate the high-speed semiconductor memory device, an interface training operation between the high-speed semiconductor memory device and a data process device must be performed at an initial operation.

Herein, the interface training is to train an interface for transferring commands, addresses, and data between the semiconductor memory device and the data process device to operate at an optimal time before a normal operation.

The interface training is categorized to clock alignment training (WCK2CK training), read training, and write training. In the clock alignment training (WCK2CK training), the data clock and the system clock are aligned.

FIG. 1 is a block diagram of a circuit for performing the clock alignment training in accordance with a conventional technology.

First, in the basic principle of the clock alignment training, the high-speed semiconductor memory device receives an address signal and a command signal from an external controller on the basis of the system clock HCK, and outputs data stored in the semiconductor memory device to the external controller on the basis of the data clock WCK as described above.

Accordingly, when there is a phase difference between the system clock HCK and the data clock WCK, the data stored in the semiconductor memory device reach the external controller more quickly or more slowly by a time corresponding to the phase difference.

Consequently, the clock alignment training is an operation of the high-speed semiconductor memory device that detects a phase difference between the data clock WCK and the system clock HCK applied from the external controller at an initial operation, transmits the detection result to the external controller, and thus reduces the phase difference between the system clock HCK and the data clock WCK.

That is, in the circuit for performing the clock alignment training in accordance with the conventional technology illustrated in FIG. 1, the circuit receives the data clock WCK and the system clock HCK from the external controller, detects the phase difference between the data clock WCK and the system clock HCK, and transmits the detection result to the external controller.

Referring to FIG. 1, the circuit includes a clock inputting unit 100 receiving the system clock HCK for synchronizing an input time of the address signal and an input time of the command signal and the data clock WCK, which has a frequency higher than that of the system clock HCK, for synchronizing an input time of the data signal from the external controller, a frequency converting unit 120 converting a frequency of the data clock WCK in order for the data clock WCK to have the same frequency as that of the system clock HCK, a phase detecting unit 140 detecting a phase of a clock DIV_WCK output from the frequency converting unit 120 on the basis of a phase of the system clock HCK and generating a detection signal DET_SIG corresponding to the detection result, and a signal transmitting unit 160 transmitting the detection signal DET_SIG as a training information signal TRAINING_INFO_SIG to the external controller. The circuit includes a clock inputting unit 100 includes a data clock input pad 106, a data clock input buffer 108, a system clock input pad 102, and a system input buffer 104. The signal transmitting unit 160 includes a training information output buffer 162 and a training information output pad 164.

FIG. 2 is a timing diagram illustrating an operation waveform of a case where the circuit for performing the clock alignment training in accordance with the conventional technology of FIG. 1 normally performs the clock alignment training.

Referring to FIG. 2, although a frequency of the data clock WCK, which is input to the circuit for performing the clock alignment training in accordance with the conventional technology from the external controller, is higher than that of the system clock HCK, it can be seen that a frequency of the data division clock DIV_WCK output from the clock dividing unit 120 is the same as that of the system clock HCK, because the clock dividing unit 120 changes a frequency of the data clock WCK in order for the frequency of the data clock WCK to be the same as that of the system clock HCK.

Moreover, clock edges are not synchronized with one another at a section ① before the performing the clock alignment training operation. That is, it can be seen that the phase of the data clock WCK and the phase of the data division clock DIV_WCK are not synchronized with the phase of the system clock HCK at the section ① before the performing the clock alignment training operation.

The circuit changes the phase of the data clock WCK and the phase of the data division clock DIV_WCK in a state where the phase of the system clock HCK is constant, in order to synchronize the phase of the data clock WCK and the phase of the data division clock DIV_WCK with the phase of the system clock HCK at sections ②, ③, ④, ⑤, and ⑥ after the starting of the clock alignment training operation.

At this point, a phase of the data clock WCK and a phase of the data division clock DIV_WCK are changed in correspondence with a logic level of the training information signal TRAINING_INFO_SIG which is transmitted to the external controller by the signal transmitting unit 160.

Moreover, at the sections ②, ③, ④, ⑤ and ⑥ when the phase of the data clock WCK and the phase of the data division clock DIV_WCK are not synchronized with that of the system clock HCK so that they need to be changed, the logic level of the training information signal TRAINING_INFO_SIG continuously maintains a logic low state. However, in a section ⑦, in which the phase of the data clock WCK and the phase of the data division clock DIV_WCK are synchronized with that of the system clock HCK so that it is unnecessary to change the phase of the data clock WCK and the phase of the data division clock DIV_WCK, the logic level of the training information signal TRAINING_INFO_SIG continuously maintains a logic high state.

As a result, in the circuit for performing the clock alignment training, the phase detecting unit 140 continuously compares the phase of the data clock WCK with the phase of the system clock WCK until the phase of the data clock WCK input from the external controller by the clock alignment training operation is synchronized with that of the system clock HCK, and thereafter the training information signal TRAINING_INFO_SIG is transferred to the external controller according to a result of the comparison.

FIG. 3 is a timing diagram illustrating an operation waveform of a case where the circuit for performing the clock alignment training in accordance with the conventional technology of FIG. 1 abnormally performs the clock alignment training by a jitter.

Referring to FIG. 3, the operation waveforms of the sections ②, ③, ④, ⑤, and ⑥ from a time when the clock alignment training is started at section ① before performing the clock alignment training operation to a time when the phase of the data clock WCK is synchronized with the phase of the system clock HCK are the same as the operation waveforms of the case of FIG. 2. In the case of FIG. 2, the clock alignment training operation is normally performed. The operation waveforms are changed from a state where the phase of the data clock WCK, which is inputted to the circuit for performing the clock alignment training according to a conventional technology from the external controller, is not synchronized with that of the system clock HCK to a state where the phase of the data clock WCK is synchronized with the phase of the system clock HCK.

That is, the phase of the data clock WCK and the phase of the data division clock DIV_WCK are changed according to the logic level of the training information signal TRAINING_INFO_SIG which is transmitted to the external controller by the signal transmitting unit 160 in a state where the phase of the system clock HCK is constant, and thus the phase of the data clock WCK is synchronized with that of the system clock HCK.

However, unlike the operation waveforms of FIG. 2, at a time ⑥ when the clock alignment training is normally performed so that the phase of the data clock WCK is synchronized with that of the system clock HCK, a phenomenon that the phase of the data clock WCK and the phase of system clock HCK are changed by a noise or a jitter can occur, and, consequently, the phase of the phase-synchronized data clock WCK is not synchronized with the phase of the phase-synchronized system clock HCK as shown in the sections ⑦ and ⑨.

Specifically, the logic level of the training information signal TRAINING_INFO_SIG continuously maintains a logic low state at the sections ②, ③, ④, ⑤, and ⑥ where the phase of the data clock WCK and the phase of the data division clock DIV_WCK are not synchronized with that of the system clock HCK so that they need to be changed. The logic level of the training information signal TRAINING_INFO_SIG is changed into a logic high level at a time ⑥ when the clock alignment training is normally performed so that the phase of the data clock WCK is synchronized with that of the system clock HCK. However, the phase of the system clock HCK is immediately changed by a noise or a jitter as shown in section ⑦ of FIG. 3 so that the phase of the data clock WCK is not synchronized with that of the system clock HCK, and, consequently, the logic level of the training information signal TRAINING_INFO_SIG is again changed into a logic low level.

Likewise, as soon as the logic level of the training information signal TRAINING_INFO_SIG is again changed into a logic low level due to the phase change of the system clock HCK by a noise or a jitter, the phase of the data clock WCK is again changed, and thus the phase of the data clock WCK is again synchronized with the phase of the system clock HCK as shown at a section ⑧ of FIG. 3. However, the phase of the data clock WCK is immediately changed by a noise or a jitter as shown at a section ⑨ of FIG. 3 so that the phase of the data clock WCK is not synchronized with the phase of the system clock HCK, and, consequently, the logic level of the training information signal TRAINING_INFO_SIG is again changed into a logic low level.

As described above, although the circuit for performing the clock alignment training in accordance with the conventional technology synchronizes the phase of the data clock WCK with the phase of the system clock HCK by performing the clock alignment training, the phase of the data clock WCK and the phase of the system clock HCK may be changed by a noise or a jitter, unlike a phase in synchronizing them with each other, and consequently the logic level of the training information signal TRAINING_INFO_SIG, which is transmitted to the external controller to inform a result of the clock alignment training operation, may continuously be charged from a logic low level to a logic high level or from a logic high level to a logic low level.

In this way, when the logic level of the training information signal TRAINING_INFO_SIG is continuously charged by a noise or a jitter, a confusion occurs in the external controller that must synchronize the phase of the data clock WCK with the phase of the system clock HCK on the basis of the logic level of the training information signal TRAINING_INFO_SIG and transmit the data clock WCK and the system clock HCK to the semiconductor memory device, and thus a very long time may be required for performing the clock alignment training or a malfunction can be caused by a wrong clock alignment training.

SUMMARY OF THE INVENTION

Embodiments of the present invention are directed to providing a circuit, which compares a phase of a data clock with a phase of a system clock several times at a predetermined time interval in terms of statistics and extracts a final phase comparison result on the basis of the comparison result even though an unstable phase comparison result is caused by a noise or a jitter in a process of comparing the data clock with the system clock under clock alignment training operation, thereby transmitting a stable result of a clock alignment training operation to an external controller.

In an accordance with an aspect of the disclosure, there is provided a semiconductor device, which includes, a first phase detecting unit configured to detect a phase of a second clock on the basis of a phase of a first clock, and generate a first detection signal corresponding to a result of the detection, a second phase detecting unit configured to detect a phase of a delayed clock, which is generated by delaying the second clock by a predetermined time, on the basis of the phase of the first clock, and generate a second detection signal corresponding to a result of the detection; and a logic level determining unit configured to determine a logic level of a feedback output signal according to the first detection signal, the second detection signal and the feedback output signal.

In an accordance with another aspect of the disclosure, there is provided a semiconductor device, including a clock inputting unit configured to receive a first clock for synchronizing an input time of an address signal and an input time of a command signal and a second clock for synchronizing an input time of a data signal from the outside, a first phase detecting unit configured to detect a phase of the second clock on the basis of a phase of the first clock, and generate a first detection signal corresponding to a result of the detection, a second phase detecting unit configured to detect a phase of a delayed clock, which is generated by delaying the second clock by a predetermined time, on the basis of the phase of the first clock, and generate a second detection signal corresponding to a result of the detection, a logic level determining unit configured to determine a logic level of a majority determination signal according to the first detection signal, the second detection signal and a training information signal, a training information signal outputting unit configured to output the majority determination signal as the training information signal according to the first clock; and a signal transmitting unit configured to transmit the training information signal to the outside.

In an accordance with another aspect of the disclosure, there is provided a semiconductor device, which includes a clock inputting unit configured to receive a first clock for synchronizing an input time of an address signal and an input time of a command signal and a second clock for synchronizing an input time of a data signal from the outside, a frequency converting unit configured to convert a frequency of the second clock in order for the second clock to have the same frequency as a frequency of the first clock, a first phase detecting unit configured to detect a phase of a clock output from the frequency converting unit on the basis of a phase of the first clock, and generate a first detection signal corresponding to a result of the detection, a second phase detecting unit configured to detect a phase of a delayed clock, which is generated by delaying the clock output from the frequency converting unit by a predetermined time, on the basis of the phase of the first clock, and generate a second detection signal corresponding to a result of the detection, a logic level determining unit configured to determine a logic level of a majority determination signal according to the first detection signal, the second detection signal and a training information signal, a training information signal outputting unit configured to output the majority determination signal as the training information signal according to the first clock; and a signal transmitting unit configured to transmit the training information signal to the outside.

DESCRIPTION OF SPECIFIC EMBODIMENTS

Other objects and advantages of the present subject matter can be understood by the following description, and become apparent with reference to the embodiments of the present invention. The present subject matter may, however, be embodied in different forms and should not be construed as limited to the embodiments set forth herein. Rather, these embodiments are provided so that this disclosure will be thorough and complete, and will fully convey the scope of the present subject matter to those skilled in the art.

Figure 4:
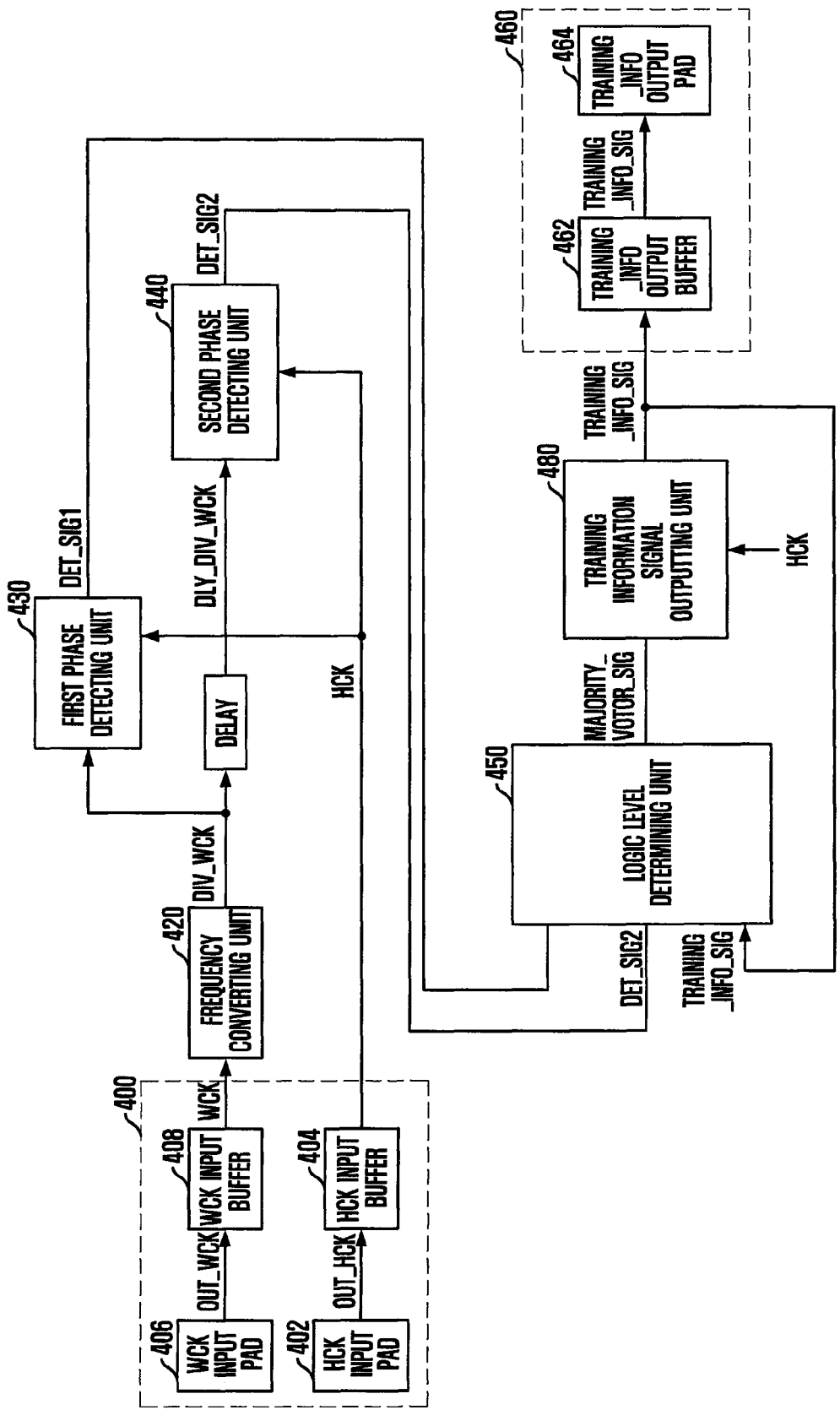
FIG. 4 is a block diagram of a circuit for performing clock alignment training in accordance with an embodiment of the present invention.

FIG. 4 is a block diagram of a circuit for performing clock alignment training in accordance with an embodiment of the present invention.

Referring to FIG. 4, the circuit for performing the clock alignment training includes a clock inputting unit 400 receiving a system clock HCK for synchronizing an input time of an address signal and an input time of a command signal and a data clock WCK, which has a frequency higher than that of the system clock HCK, for synchronizing an input time of a data signal from the external controller, a frequency converting unit 420 converting a frequency of the data clock WCK in order for the data clock WCK to have the same frequency as that of the system clock HCK, and a first phase detecting unit 430 detecting a phase of a clock DIV_WCK outputted from the frequency converting unit 420 on the basis of a phase of the system clock HCK and generating a first detection signal DET_SIG1 corresponding to the result of the detection, a second phase detecting unit 430 detecting a phase of a clock DLY_DIV_WCK, which is generated by delaying the clock DIV_WCK outputted from the frequency converting unit 420 by a predetermined time, on the basis of the phase of the system clock HCK and generating a second detection signal DET_SIG2 corresponding to the result of the detection. The circuit further includes a logic level determining unit 450 determining a logic level of a majority of determination signal MAJORITY_VOTOR_SIG according to a logic level of the first detection signal DET_SIG1, a logic level of the second detection signal DET_SIG2 and a logic level of a training information signal TRAINING_INFO_SIG when two or more signals of the first detection signal DET_SIG1, the second detection signal DET_SIG2, and the training information signal TRAINING_INFO_SIG have the same logic level, a training information signal outputting unit 480 outputting the majority of determination signal MAJORITY_VOTOR_SIG as the training information signal TRAINING_INFO_SIG according to the system clock HCK, and a signal transmitting unit 460 transmitting the training information signal TRAINING_INFO_SIG to the external controller, Herein, although not illustrated, the first phase detecting unit 430 includes a D flip-flop receiving the clock DIV_WCK output from the frequency converting unit 420 through a data input terminal, receiving the system clock HCK through a clock input terminal, and outputting the first detection signal DET_SIG1 through an output terminal.

Moreover, although not illustrated, the second phase detecting unit 440 includes a D flip-flop receiving the clock DLY_DIV_WCK, which is generated by delaying the clock DIV_WCK output from the frequency converting unit 420 by a predetermined time, through a data input terminal, receiving the system clock HCK through a clock input terminal, and outputting the second detection signal DET_SIG2 through an output terminal.

The training information signal outputting unit 480, although not illustrated, includes a D flip-flop receiving the majority determination signal MAJORITY_VOTOR_SIG through a data input terminal, receiving the system clock HCK through a clock input terminal, and outputting the training information signal TRAINING_INFO_SIG through an output terminal.

The clock inputting unit 400 includes a system clock input pad 402 receiving a system clock OUT_HCK applied from the external controller, a system clock input buffer 404 buffering the system clock OUT_HCK transferred through the system clock input pad 302 and outputting the buffered system clock HCK, a data clock input pad 406 receiving a data clock OUT_WCK applied from the external controller, wherein the data clock OUT_WCK has a frequency higher than that of the system clock OUT_HCK HCK applied from the external controller, and a data input buffer 408 buffering the data clock OUT_WCK transferred through the data clock input pad 406 and outputting the buffered data clock WCK.

The signal transmitting unit 460 includes a training information output buffer 462 buffering the training information signal TRAINING_INFO_SIG and outputting a buffered signal BUF_TRAINING_INFO_SIG, and a training information output pad 464 transmitting the training information signal BUF_TRAINING_INFO_SIG buffered by the training information output buffer 462 to the external controller.

Figure 5:
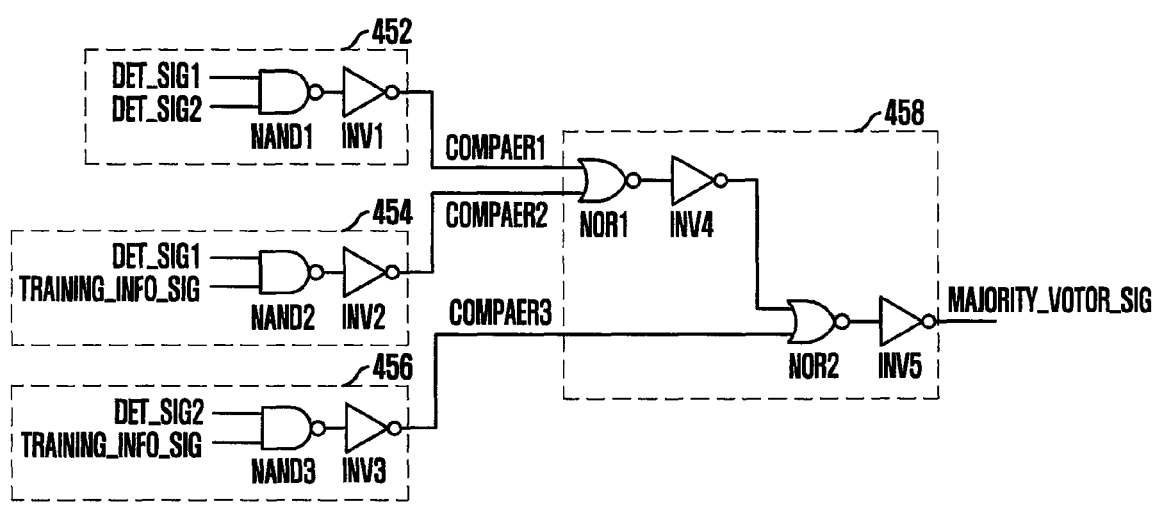
FIG. 5 is a detailed circuit diagram of a logic level determining unit of the elements of a circuit for performing the clock alignment training in accordance with the embodiment of FIG. 4.

FIG. 5 is a detailed circuit diagram of the logic level determining unit of the elements of the circuit for performing the clock alignment training in accordance with the embodiment of FIG. 4.

Referring to FIG. 5, the logic level determining unit 450 of the circuit for performing the clock alignment training includes a first logic level comparator 452 comparing a logic level of the first detection signal DET_SIG1 with a logic level of the second detection signal DET_SIG2, a second logic level comparator 454 comparing the logic level of the first detection signal DET_SIG1 with the logic level of the training information signal TRAINING_INFO_SIG, a third logic level comparator 456 comparing the logic level of the second detection signal DET_SIG2 with the logic level of the training information signal TRAINING_INFO_SIG, and a logic level charge controller 458 controlling the charge of the logic level of the majority determination signal MAJORITY_VOTOR_SIG according to an output signal COMPARE1 of the first logic level comparator 452, an output signal COMPARE2 of the second logic level comparator 454 and an output signal COMPARE3 of the third logic level comparator 456.

The first logic level comparator 452 includes a NAND gate NAND1 receiving the first detection signal DET_SIG1 through a first input terminal, receiving the second detection signal DET_SIG2 through a second input terminal, and performing a NAND operation on the received first and second detection signals DET_SIG1, DET_SIG2, and an inverter INV1 inverting a phase of an output signal of the NAND gate NAND1 and outputting the inverted signal as a first comparison signal COMPARE1.

The second logic level comparator 454 includes a NAND gate NAND2 receiving the first detection signal DET_SIG1 through a first input terminal, receiving the training information signal TRAINING_INFO_SIG through a second input terminal, and performing a NAND operation on the received first detection signals DET_SIG1 and the training information signal TRAINING_INFO_SIG, and an inverter INV2 inverting a phase of an output signal of the NAND gate NAND2 and outputting the inverted signal as a second comparison signal COMPARE2.

The second logic level comparator 456 includes a NAND gate NAND3 receiving the second detection signal DET_SIG2 through a first input terminal, receiving the training information signal TRAINING_INFO_SIG through a second input terminal, and performing a NAND operation on the received second detection signal DET_SIG2 and the training information signal TRAINING_INFO_SIG, and an inverter INV3 inverting a phase of an output signal of the NAND gate NAND3 and outputting the inverted signal as a third comparison signal COMPARE3.

Moreover, the logic level charge controller 458 includes a first NOR gate NOR1 receiving the first comparison signal COMPARE1 output from the first logic level comparator 452 through a first input terminal, receiving the second comparison signal COMPARE2 output from the second logic level comparator 454 through a second input terminal, and performing a NOR operation on the received signals, a first inverter INV4 inverting a phase of an output signal of the first NOR gate NOR1, a second NOR gate NOR2 receiving an output signal of the first inverter INV4 through a first input terminal, receiving the third comparison signal COMPARE3 output from the third logic level comparator 456 through a second input terminal, and performing a NOR operation on the received signals, a second inverter INV5 inverting a phase of an output signal of the second NOR gate NOR2 and outputting the inverted signal as the majority determination signal MAJORITY_VOTOR_SIG.

The operations of the circuit for performing the clock alignment training in accordance with an embodiment of the present invention will be described below on the basis of the above-described configuration.

When the clock DIV_WCK which is output from the frequency converting unit 420 is activated at an edge of the system clock HCK, the first phase detecting unit 430 activates the first detection signal DET_SIG1, wherein the edge generally denotes a rising edge but may be a falling edge.

Referring back to FIG. 4, when the clock DIV_WCK which is outputted from the frequency converting unit 420 is deactivated at the edge of the system clock HCK, the first phase detecting unit 430 deactivates the first detection signal DET_SIG1.

When the clock DLY_DIV_WCK, which is generated by delaying the clock DIV_WCK outputted from the frequency converting unit 420 by a predetermined time, is activated at an edge of the system clock HCK, the second phase detecting unit 440 activates the second detection signal DET_SIG2, wherein the edge generally denotes a rising edge but may be a falling edge.

When the clock DLY_DIV_WCK, which is generated by delaying the clock DIV_WCK output from the frequency converting unit 420 by a predetermined time, is deactivated at the edge of the system clock HCK, the second phase detecting unit 440 deactivates the second detection signal DET_SIG2.

The logic level determining unit 450 charges the logic level of the majority determination signal MAJORITY_VOTOR_SIG when at least two signals of the first detection signal DET_SIG1, the second detection signal DET_SIG2 and the training information signal TRAINING_INFO_SIG have the same logic level and the training information signal TRAINING_INFO_SIG is not included in at least two signals.

The logic level determining unit 450 does not charge the logic level of the majority determination signal MAJORITY_VOTOR_SIG when at least two signals of the first detection signal DET_SIG1, the second detection signal DET_SIG2 and the training information signal TRAINING_INFO_SIG have the same logic level and the training information signal TRAINING_INFO_SIG is included in at least two signals.

More specifically, when at least two signals of the first detection signal DET_SIG1, the second detection signal DET_SIG2 and the training information signal TRAINING_INFO_SIG are deactivated, the logic level determining unit 450 deactivates the majority determination signal MAJORITY_VOTOR_SIG.

For example, when one of the first detection signal DET_SIG1 and the second detection signal DET_SIG2 is activated, the other is deactivated and the training information signal TRAINING_INFO_SIG is deactivated, the logic level determining unit 450 does not charge the logic level of the majority determination signal MAJORITY_VOTOR_SIG in a case where the logic level of the first detection signal DET_SIG1 or the logic level of the second detection signal DET_SIG2 is charged so that both the first detection signal DET_SIG1 and the second detection signal DET_SIG2 are deactivated, i.e., a case where one of the first detection signal DET_SIG1 and the second detection signal DET_SIG2 is charged from an activation state to a deactivation state.

At this point, since the training information signal TRAINING_INFO_SIG is the majority determination signal MAJORITY_VOTOR_SIG, which is synchronized with the system clock HCK by the training information signal outputting unit 480, the logic level of the majority determination signal MAJORITY_VOTOR_SIG may be the same as the logic level of the training information signal TRAINING_INFO_SIG. Furthermore, the logic level of the majority determination signal MAJORITY_VOTOR_SIG not being charged can denote that the deactivated training information signal TRAINING_INFO_SIG continuously maintains a deactivation state.

On the other hand, when one of the first detection signal DET_SIG1 and the second detection signal DET_SIG2 is activated, the other is deactivated and the training information signal TRAINING_INFO_SIG is activated, the logic level determining unit 450 charges the logic level of the majority determination signal MAJORITY_VOTOR_SIG in a case where the logic level of the first detection signal DET_SIG1 or the logic level of the second detection signal DET_SIG2 is charged so that both the first detection signal DET_SIG1 and the second detection signal DET_SIG2 are activated, i.e., a case where one of the first detection signal DET_SIG1 and the second detection signal DET_SIG2 is charged from an activation state to a deactivation state.

At this point, since the training information signal TRAINING_INFO_SIG is the majority determination signal MAJORITY_VOTOR_SIG which is synchronized with the system clock HCK by the training information signal outputting unit 480, the logic level of the majority determination signal MAJORITY_VOTOR_SIG may be the same as the logic level of the training information signal TRAINING_INFO_SIG. Furthermore, the logic level of the majority determination signal MAJORITY_VOTOR_SIG being charged can denote that the training information signal TRAINING_INFO_SIG is charged from an activation state to a deactivation state.

When at least two signals of the first detection signal DET_SIG1, the second detection signal DET_SIG2 and the training information signal TRAINING_INFO_SIG are activated, the logic level determining unit 450 activates the majority determination signal MAJORITY_VOTOR_SIG.

For example, when one of the first detection signal DET_SIG1 and the second detection signal DET_SIG2 is activated, the other is deactivated and the training information signal TRAINING_INFO_SIG is deactivated, the logic level determining unit 450 charges the logic level of the majority determination signal MAJORITY_VOTOR_SIG in a case where the logic level of the first detection signal DET_SIG1 or the logic level of the second detection signal DET_SIG2 is charged so that both the first detection signal DET_SIG1 and the second detection signal DET_SIG2 are activated, i.e., a case where one of the first detection signal DET_SIG1 and the second detection signal DET_SIG2 is charged from a deactivation state to an activation state.

At this point, since the training information signal TRAINING_INFO_SIG is the majority determination signal MAJORITY_VOTOR_SIG, which is synchronized with the system clock HCK by the training information signal outputting unit 480, the logic level of the majority determination signal MAJORITY_VOTOR_SIG may be the same as the logic level of the training information signal TRAINING_INFO_SIG. Furthermore, the logic level of the majority determination signal MAJORITY_VOTOR_SIG being charged can denote that the training information signal TRAINING_INFO_SIG is charged from a deactivation state to an activation state.

On the other hand, when one of the first detection signal DET_SIG1 and the second detection signal DET_SIG2 is activated, the other is deactivated and the training information signal TRAINING_INFO_SIG is activated, the logic level determining unit 450 does not charge the logic level of the majority determination signal MAJORITY_VOTOR_SIG in a case where the logic level of the first detection signal DET_SIG1 or the logic level of the second detection signal DET_SIG2 is charged so that both the first detection signal DET_SIG1 and the second detection signal DET_SIG2 are activated, i.e., a case where one of the first detection signal DET_SIG1 and the second detection signal DET_SIG2 is charged from a deactivation state to an activation state.

At this point, since the training information signal TRAINING_INFO_SIG is the majority determination signal MAJORITY_VOTOR_SIG, which is synchronized with the system clock HCK by the training information signal outputting unit 480, the logic level of the majority determination signal MAJORITY_VOTOR_SIG may be the same as the logic level of the training information signal TRAINING_INFO_SIG. Furthermore, the logic level of the majority determination signal MAJORITY_VOTOR_SIG not being charged can denote that the activated training information signal TRAINING_INFO_SIG continuously maintains an activation state.

Figure 6:
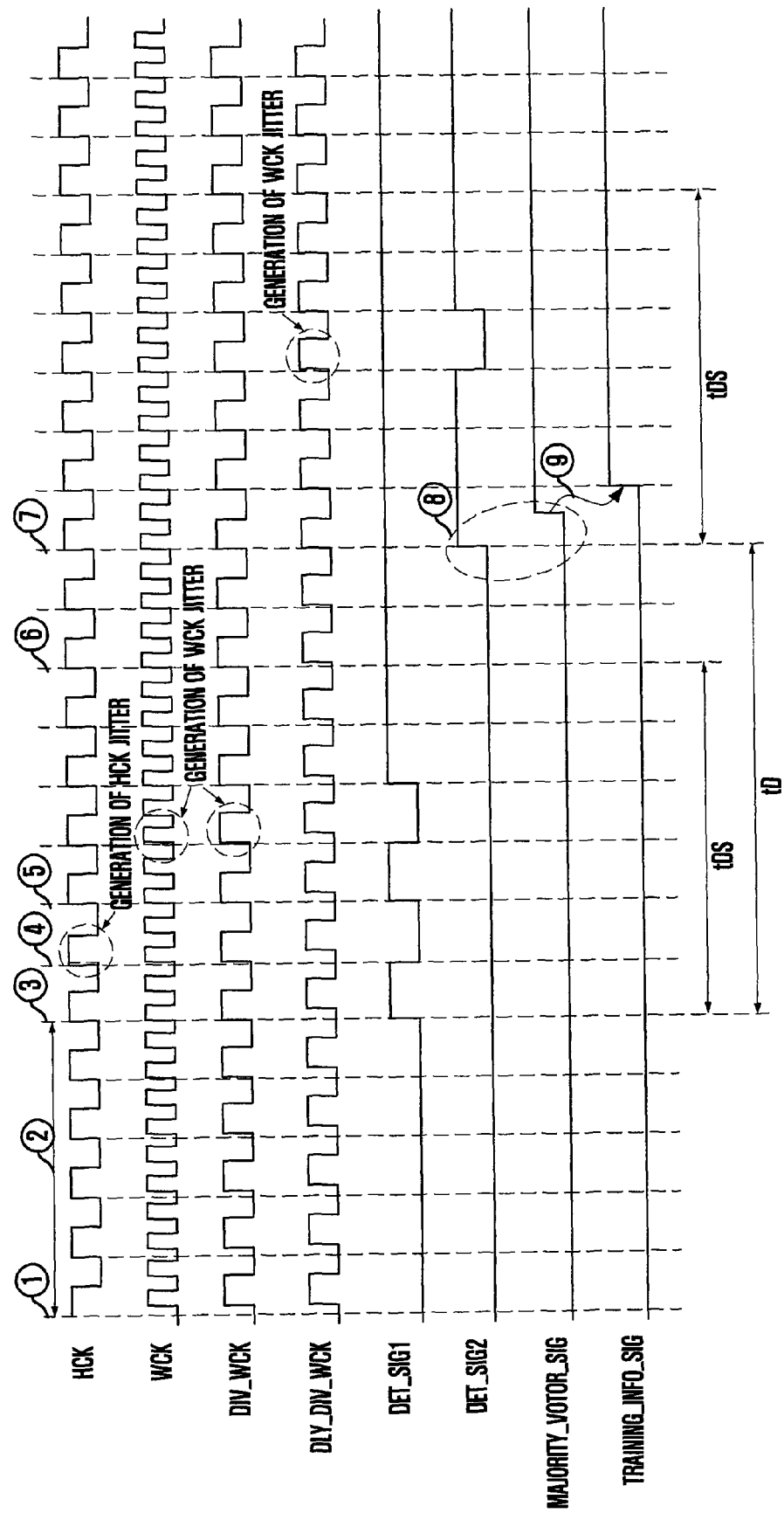
FIG. 6 is a timing diagram of the circuit for performing the clock alignment training in accordance with the embodiment of FIG. 4.

FIG. 6 is a timing diagram of the circuit for performing the clock alignment training in accordance with the embodiment of FIG. 4.

Figure 2:
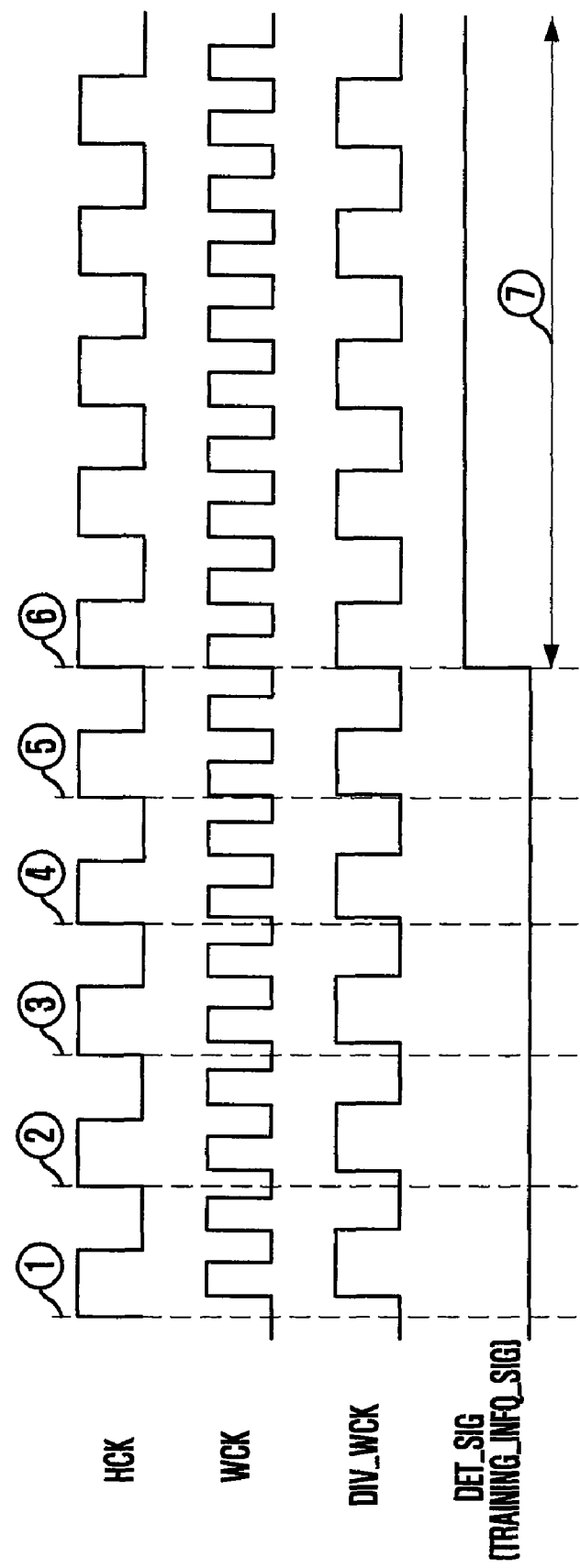
FIG. 2 is a timing diagram illustrating an operation waveform of a case where the circuit for performing the clock alignment training in accordance with the conventional technology of FIG. 1 normally performs the clock alignment training.
Figure 3:
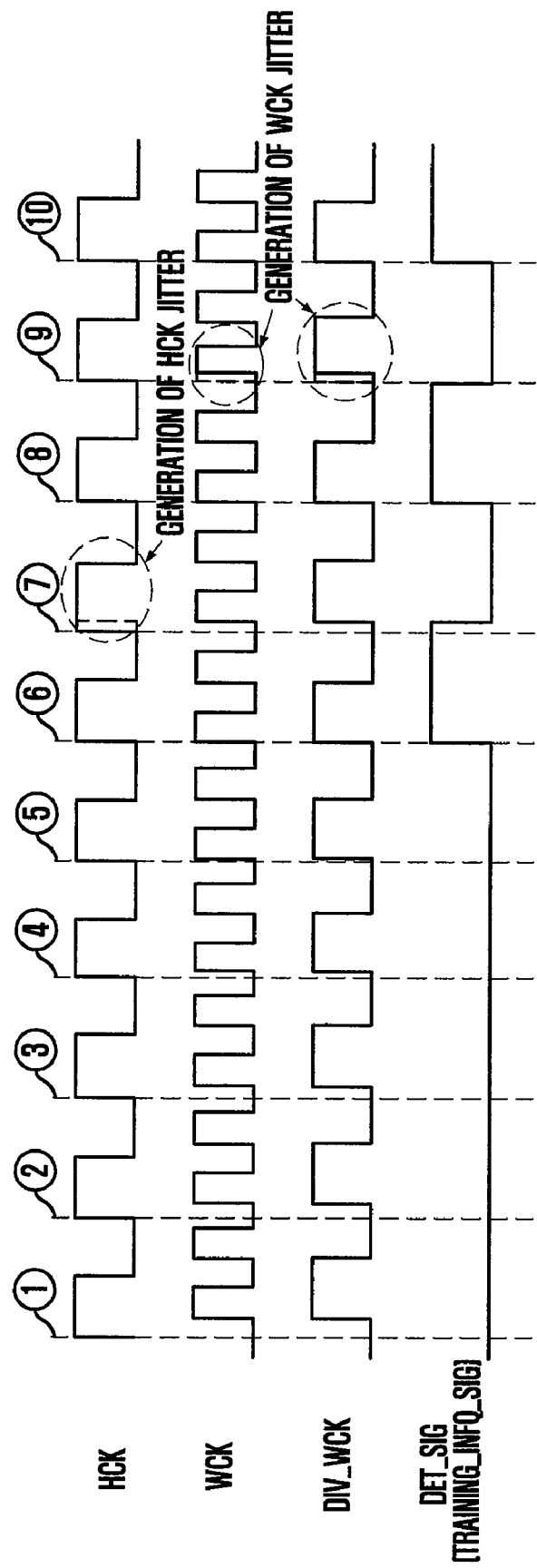
FIG. 3 is a timing diagram illustrating an operation waveform of a case where the circuit for performing the clock alignment training in accordance with the conventional technology of FIG. 1 abnormally performs the clock alignment training by a jitter.

Referring to FIG. 6, in the circuit for performing the clock alignment training in accordance with the embodiment of FIG. 4, the operation waveforms of a section ②, which lasts from a time when the clock alignment training is started at the section ① before the performing of the clock alignment training operation to a time when the phase of the data clock WCK is synchronized with the phase of the system clock HCK, are the same as the operation waveforms of the cases of FIGS. 2 and 3. In the cases of FIGS. 2 and 3, the clock alignment training operation normally is performed. Under the normal clock alignment training operation, the operation waveforms are changed from a state, where the phase of the data clock WCK which is inputted to the circuit for performing the clock alignment training according to a conventional technology from the external controller is not synchronized with that of the system clock HCK, to a state where the phase of the data clock WCK is synchronized with the phase of the system clock HCK.

That is, the phase of the data clock WCK and the phase of the data division clock DIV_WCK are changed according to the logic level of the training information signal TRAINING_INFO_SIG, which is transmitted to the external controller by the signal transmitting unit 460 in a state where the phase of the system clock HCK is constant, and thus the phase of the data clock WCK is synchronized with that of the system clock HCK.

Although the phase of the data clock WCK is not momentarily synchronized with that of the system clock HCK by a noise or a jitter at a section ③ immediate after the clock alignment training is performed so that the phase of the data clock WCK is synchronized with that of the system clock HCK, the logic level of the training information signal TRAINING_INFO_SIG transmitted to the external controller is not changed.

More specifically, in the operation waveforms of the circuit for performing the clock alignment training in accordance with an embodiment of the present subject matter, the logic level of the first detection signal DET_SIG1, the logic level of the second detection signal DET_SIG2, the logic level of the majority determination signal MAJORITY_VOTOR_SIG and the logic level of the training information signal TRAINING_INFO_SIG continuously maintain a logic low state until the section ② where the phase of the data clock WCK and the phase of the data division clock DIV_WCK are not synchronized with that of the system clock HCK so that they need to be changed, and it is changed into a logic high level at a time ⑥ when the clock alignment training is normally performed so that the phase of the data clock WCK is synchronized with that of the system clock HCK.

Since the logic level of the first detection signal DET_SIG1 is changed into a logic high level whereas the logic level of the second detection signal DET_SIG2 is a logic low level without changing into a logic high level at the moment ③ when the clock alignment training is normally performed so that the phase of the data clock WCK is synchronized with that of the system clock HCK, the logic level of the majority determination signal MAJORITY_VOTOR_SIG and the logic level of the training information signal TRAINING_INFO_SIG continuously maintain a logic low state.

At this point, the logic level of the second detection signal DET_SIG2 maintains a logic low level without changing into a logic high level though the logic level of the first detection signal DET_SIG1 changes from a logic low level to a logic high level for the following reasons. When the phase of the clock DIV_WCK outputted from the frequency converting unit 420 is detected on the basis of the phase of the system clock HCK, the first detection signal DET_SIG1 is a signal corresponding to a result of the detection, and the clock DIV_WCK is substantially the same as the data clock WCK although the clock DIV_WCK has a frequency different from that of the data clock WCK. When the phase of the clock DLY_DIV_WCK, which is generated by delaying the phase of the clock DIV_WCK outputted from the frequency converting unit 420 by a predetermined time tD is detected on the basis of the phase of the system clock HCK, the second detection signal DET_SIG2 is a signal corresponding to a result of the detection.

That is, as illustrated in FIG. 6, even in a state ③ where the phase of the clock DIV_WCK outputted from the frequency converting unit 420 by the clock alignment training operation is synchronized with that of the system clock HCK, the clock DLY_DIV_WCK, which is generated by delaying the phase of the clock DIV_WCK outputted from the frequency converting unit 420 by a predetermined time tD, is not synchronized with the phase of the system clock HCK at all. The logic level of the first detection signal DET_SIG1 is changed from a logic low level to a logic high level, whereas the logic level of the second detection signal DET_SIG2 maintains a logic low level.

When at least two signals of the first detection signal DET_SIG1, the second detection signal DET_SIG2 and the training information signal TRAINING_INFO_SIG, i.e., the second detection signal DET_SIG2 and the training information signal TRAINING_INFO_SIG, have the same logic level, i.e., a logic low level, the majority determination signal MAJORITY_VOTOR_SIG maintains a logic low level without charging to a logic high level, because the training information signal TRAINING_INFO_SIG is included in at least two signals.

Even in a case that the phase of the data clock WCK is not again synchronized with that of the system clock HCK because the phase of the system clock HCK is changed by a noise or a jitter occurring immediately at a section ④ of FIG. 6 and the section ⑦ of FIG. 3, the majority determination signal MAJORITY_VOTOR_SIG and the training information signal TRAINING_INFO_SIG continuously maintain a logic low level because the logic level of the first detection signal DET_SIG1 is changed from a logic high level to a logic low level and the second detection signal DET_SIG2 continuously maintains a logic low level.

At this point, the second detection signal DET_SIG2 maintains a logic low level though the logic level of the first detection signal DET_SIG1 changes from a logic high level to a logic low level for the following reasons. When the phase of the clock DIV_WCK output from the frequency converting unit 420 is detected on the basis of the phase of the system clock HCK, the first detection signal DET_SIG1 is a signal corresponding to a result of the detection. When the phase of the clock DLY_DIV_WCK, which is generated by delaying the phase of the clock DIV_WCK output from the frequency converting unit 420 by a predetermined time tD is detected on the basis of the phase of the system clock HCK, the second detection signal DET_SIG2 is a signal corresponding to a result of the detection.

That is, as shown in FIG. 6, even in a case that the phase of the clock DIV_WCK outputted from the frequency converting unit 420 and the phase of the system clock HCK are changed from a synchronous state ③ to an asynchronous state ④, since the clock DLY_DIV_WCK, which is generated by delaying the phase of the clock DIV_WCK outputted from the frequency converting unit 420 by a predetermined time tD, is not synchronized with the phase of the system clock HCK at all, the logic level of the first detection signal DET_SIG1 is changed from a logic high level to a logic low level, whereas the second detection signal DET_SIG2 maintains a logic low level.

When at least two signals of the first detection signal DET_SIG1, the second detection signal DET_SIG2 and the training information signal TRAINING_INFO_SIG, i.e., the first detection signal DET_SIG1, the second detection signal DET_SIG2, and the training information signal TRAINING_INFO_SIG, have the same logic level, i.e., a logic low level, the majority determination signal MAJORITY_VOTOR_SIG maintains a logic low level without charging to a logic high level, because the training information signal TRAINING_INFO_SIG is included in at least two signals.

Likewise, in a case that the phase of the data clock WCK is again changed by the continual clock alignment training and the phase of the data clock WCK is, consequently, synchronized with that of the system clock HCK as shown at a section ⑤ of FIG. 6, since the logic level of the first detection signal DET_SIG1 is changed into a logic high level, whereas the logic level of the second detection signal DET_SIG2 is a logic low level without changing into a logic high level, the majority determination signal MAJORITY_VOTOR_SIG and the training information signal TRAINING_INFO_SIG continuously maintain a logic low level.

At this point, the second detection signal DET_SIG2 maintains a logic low level as it does not change into a logic high level, though the logic level of the first detection signal DET_SIG1 changes from a logic low level to a logic high level for the following reasons. When the phase of the clock DIV_WCK output from the frequency converting unit 420 is detected on the basis of the phase of the system clock HCK, the first detection signal DET_SIG1 is a signal corresponding to a result of the detection. When the phase of the clock DLY_DIV_WCK, which is generated by delaying the phase of the clock DIV_WCK outputted from the frequency converting unit 420 by a predetermined time tD, is detected on the basis of the phase of the system clock HCK, the second detection signal DET_SIG2 is a signal corresponding to a result of the detection.

That is, as shown in FIG. 6, even in a case that the phase of the clock DIV_WCK outputted from the frequency converting unit 420 is synchronized with that of the system clock HCK by the continual clock alignment training operation as shown at a section ⑤ of FIG. 6, since the phase of the clock DLY_DIV_WCK, which is generated by delaying the phase of the clock DIV_WCK outputted from the frequency converting unit 420 by a predetermined time tD, is not synchronized with that of the system clock HCK at all, the logic level of the first detection signal DET_SIG1 is changed from a logic low level to a logic high level whereas the second detection signal DET_SIG2 maintains a logic low level as it does not change into a logic high level.

Moreover, when at least two signals of the first detection signal DET_SIG1, the second detection signal DET_SIG2, and the training information signal TRAINING_INFO_SIG, i.e., the first detection signal DET_SIG1, the second detection signal DET_SIG2, and the training information signal TRAINING_INFO_SIG, have the same logic level, i.e., a logic low level, the majority determination signal MAJORITY_VOTOR_SIG maintains a logic low level as it does not charge to a logic high level, because the training information signal TRAINING_INFO_SIG is included in the at least two signals.

As a result, when time elapses by a predetermined time tD from a time ③ at which the phase of the data clock WCK is synchronized with that of the system clock HCK for the first time so that the phase of the clock DLY_DIV_WCK, which is generated by delaying the phase of the clock DIV_WCK output from the frequency converting unit 420 by a predetermined time tD, is synchronized with that of the system clock HCK for the first time at a time ⑦ of FIG. 6, the logic level of the majority determination signal MAJORITY_VOTOR_SIG and the logic level of the training information signal TRAINING_INFO_SIG are changed from a logic low level to a logic high level. The logic level of the second detection signal DET_SIG2 is changed into a logic high level in a state where the logic level of the first detection signal DET_SIG1 is a constant logic high level.

At this point, the reason why the state where the logic level of the first detection signal DET_SIG1 is constant is a logic high level is because, it is assumed that a necessary time tDS elapses from a time ③, when the phase of the data clock WCK is synchronized for the first time with that of the system clock HCK to a time ⑥, when the phase of the data clock WCK is completely synchronized with that of the system clock HCK, so that the logic level of the first detection signal DET_SIG1 is constant as a logic high level.

That is, by a continual test or a statistic probability, the clock alignment training is continuously performed irrespective of a noise or a jitter occurring in the system clock HCK and the data clock WCK. Thereby, at a time ⑥, the phase of the data clock WCK is completely synchronized with that of the system clock HCK from a time ③. When the phase of the data clock WCK is synchronized with that of the system clock HCK for the first time, the logic level of the first detection signal DET_SIG1 is constant as a logic high level after a time ⑥.

In this way, at a time ⑦ when the phase of the clock DLY_DIV_WCK, which is generated by delaying the phase of the clock DIV_WCK by a predetermined time tD, is synchronized with that of the system clock HCK for the first time after a time ⑥ when the phase of the data clock WCK is completely synchronized with that of the system clock HCK, the logic level of the second detection signal DET_SIG2 is changed into a logic high level. Thereby, at least two signals of the first detection signal DET_SIG1, the second detection signal DET_SIG2, and the training information signal TRAINING_INFO_SIG, i.e., the first detection signal DET_SIG1, and the second detection signal DET_SIG2, have the same logic level, i.e., a logic high level, the logic level of the majority determination signal MAJORITY_VO- TOR_SIG is charged from a logic low level to a logic high level, because the training information signal TRAINING_INFO_SIG is not included in at least two signals. That is, the logic level of the training information signal TRAINING_INFO_SIG is charged from a logic low level to a logic high level.

At this point, since the majority determination signal MAJORITY_VOTOR_SIG and the training information signal TRAINING_INFO_SIG, which have once been charged from a logic low level to a logic high level, are not charged from a logic high level to a logic low level as long as both the first detection signal DET_SIG1 and the second detection signal DET_SIG2 are not charged to a logic low level, although a jitter occurring in the data clock WCK again occurs in the clock DLY_DIV_WCK, which is generated by delaying the phase of the clock DIV_WCK by a predetermined time tD, the jitter has no influence on changing the logic level of the majority determination signal MAJORITY_VOTOR_SIG and the logic level of the training information signal TRAINING_INFO_SIG.

Additionally, since the charge time of the logic level of the majority determination signal MAJORITY_VOTOR_SIG cannot be synchronized with the system clock HCK due to time taken until the logic level determining unit 450 compares/determines the logic level of the first detection signal DET_SIG1, and the logic level of the second detection signal DET_SIG2 and the logic level of the training information signal TRAINING_INFO_SIG determines the logic level of the majority determination signal MAJORITY_VOTOR_SIG as shown in a section ⑧ of FIG. 6, the charge time of the logic level of the majority determination signal MAJORITY_VOTOR_SIG needs to be synchronized with the system clock HCK at the charge time of the logic level of the training information signal TRAINING_INFO_SIG through the training information signal outputting unit 480 as shown in a section ⑨ of FIG. 6.

Moreover, only in a case where a time tD taken from a time ③ when the phase of the data clock WCK is synchronized with that of the system clock HCK for the first time to a time ⑦ when the phase of the clock DLY_DIV_WCK is synchronized with that of the system clock HCK for the first time is longer than a time tDS taken from a time ③ when the phase of the data clock WCK is synchronized with that of the system clock HCK for the first time to a time ⑥ when the phase of the data clock WCK is completely synchronized with that of the system clock HCK, the circuit for performing the clock alignment training in accordance with an embodiment of the present invention can normally operate. These conditions can easily be satisfied via a test upon design, and thus a method of satisfying the conditions will be omitted because those skilled in the art can easily understand it.

Figure 1:
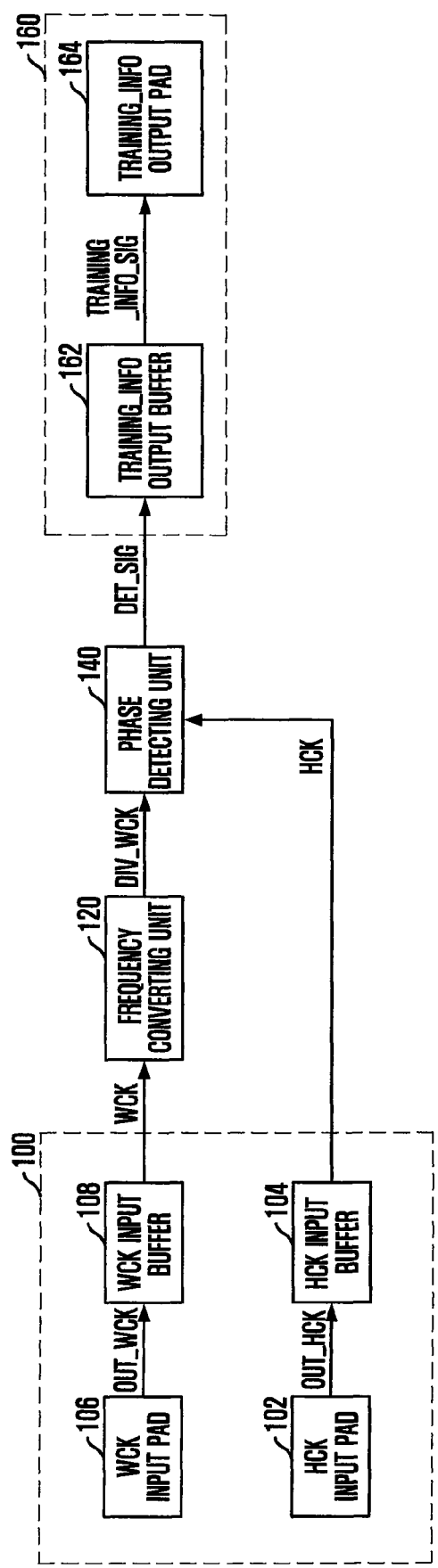
FIG. 1 is a block diagram of a circuit for performing the clock alignment training in accordance with a conventional technology.

In a configuration difference between the elements of the circuit for performing the clock alignment training in accordance with an embodiment of the present invention and the elements of the conventional technology, the conventional technology of FIG. 1 adopts only the one phase detecting unit 440, but the circuit of FIG. 4 adopts the two first and second phase detecting units 430 and 440 and further includes the logic level determining unit 450 and the training information signal outputting unit 480.

In this way, as described above, the added elements of the present invention against the conventional technology can be applied to the circuit for performing the clock alignment training as well as a circuit for stably transmitting data pulses and clocks which are inputted/outputted in a general semiconductor device regardless of a noise or a jitter.

Moreover, the added elements of the present invention may be used for detecting a phase difference between a plurality of pulses in the general semiconductor device.

As described above, in the circuit for performing the clock alignment training in accordance with an embodiment of the present invention, although an unstable phase comparison result is caused by a noise or a jitter in a process of comparing the phase of the data clock WCK with the phase of the system clock HCK under clock alignment training operation, the circuit compares the phase of the data clock WHCK with the phase of the system clock HCK several times at a predetermined time interval in terms of statistics, and extracts a final phase comparison result on the basis of the comparison result, thereby transmitting a stable phase comparison result to the external controller.

Consequently, the circuit in accordance with an embodiment of the present invention can prevent the external controller from incorrectly determining the phase difference between the data clock WCK and the system clock HCK due to a result of the clock alignment training operation.

Moreover, the circuit in accordance with an embodiment of the present invention can prevent it from taking long to perform the clock alignment training. This obviates a malfunction of the semiconductor memory device caused by a wrong clock alignment training.

While the present invention has been described with respect to the specific embodiments, it will be apparent to those skilled in the art that various changes and modifications may be made without departing from the spirit and scope of the invention as defined in the following claims.

For example, in the above-described embodiments, the logic level determining unit 450 receives three signals, and determines a logic level of a signal output according to the receipt result when at least two signals of the received three signals have the same logic level. At this point, the output signal is one of the received three signals, and thus the logic level determining unit 450 enables the output signal to have a stable logic level change. In the scope and spirit of the present invention, the logic level determining unit 450 receives more than three signals, and determines a logic level of a signal outputted according to the received result when at least the majority of the received signals has the same logic level. The scope and spirit of the present invention include a case where the output signal is included in an input signal and thus the output signal has a stable logic level change.

Moreover, in the above-described embodiments, the positions and kinds of the logic gates and the transistors must be embodied in different forms according to the polarity of an input signal.

What is claimed is:

1. A semiconductor device, comprising:
    a first phase detecting unit configured to detect a phase of a second clock on the basis of a phase of a first clock, and generate a first detection signal corresponding to a result of the detection;
    a second phase detecting unit configured to detect a phase of a delayed clock, which is generated by delaying the second clock by a predetermined time, on the basis of the phase of the first clock, and generate a second detection signal corresponding to a result of the detection; and
    a logic level determining unit configured to determine a logic level of a feedback output signal according to the first detection signal, the second detection signal and the feedback output signal.

2. The semiconductor device of claim 1, wherein when at least two signals of the first detection signal, the second detection signal and the feedback output signal have the same logic level and the feedback output signal is not comprised in the at least two signals, the logic level determining unit charges the logic level of the feedback output signal.

3. The semiconductor device of claim 1, wherein when at least two signals of the first detection signal, the second detection signal and the feedback output signal have the same logic level and the feedback output signal is comprised in the at least two signals, the logic level determining unit does not charge the logic level of the feedback output signal.

4. The semiconductor device of claim 1, wherein when at least two signals of the first detection signal, the second detection signal and the feedback output signal are deactivated, the logic level determining unit deactivates the feedback output signal.

5. The semiconductor device of claim 4, wherein when one of the first detection signal and the second detection signal is activated, the other is deactivated and the feedback output signal is deactivated, the logic level determining unit maintains a deactivation state of the feedback output signal without charging the feedback output signal in a case where a logic level of the first detection signal or a logic level of the second detection signal is charged so that all the first and second detection signals are deactivated.

6. The semiconductor device of claim 4, wherein when one of the first detection signal and the second detection signal is activated, the other is deactivated and the feedback output signal is activated, the logic level determining unit charges the logic level of the feedback output signal to deactivate the feedback output signal in a case where a logic level of the first detection signal or a logic level of the second detection signal is charged so that all the first and second detection signals are deactivated.

7. The semiconductor device of claim 1, wherein when at least two signals of the first detection signal, the second detection signal and the feedback output signal are activated, the logic level determining unit activates the feedback output signal.

8. The semiconductor device of claim 7, wherein when one of the first detection signal and the second detection signal is activated, the other is deactivated and the feedback output signal is deactivated, the logic level determining unit charges the logic level of the feedback output signal to activate the feedback output signal in a case where a logic level of the first detection signal or a logic level of the second detection signal is charged so that all the first and second detection signals are activated.

9. The semiconductor device of claim 7, wherein when one of the first detection signal and the second detection signal is activated, the other is deactivated and the feedback output signal is activated, the logic level determining unit maintains an activation state of the feedback output signal without charging the feedback output signal in a case where a logic level of the first detection signal or a logic level of the second detection signal is charged so that all the first and second detection signals are activated.

10. The semiconductor device of claim 1, wherein the logic level determining unit comprises:
a first logic level comparator configured to compare a logic level of the first detection signal with a logic level of the second detection signal;
a second logic level comparator configured to compare the logic level of the first detection signal with the logic level of the feedback output signal;
a third logic level comparator configured to compare the logic level of the second detection signal with the logic level of the feedback output signal; and
a logic level charge controller configured to control a charge of the logic level of the feedback output signal according to output signals of the first to third logic level comparators.

11. The semiconductor device of claim 1, wherein when the second clock is activated at an edge of the first clock, the first phase detecting unit activates the first detection signal.

12. The semiconductor device of claim 1, wherein when the second clock is deactivated at an edge of the first clock, the first phase detecting unit deactivates the first detection signal.

13. The semiconductor device of claim 1, wherein the second phase detecting unit activates the second detection signal when the delayed clock is activated at an edge of the first clock.

14. The semiconductor device of claim 1, wherein the second phase detecting unit deactivates the second detection signal when the delayed clock is deactivated at an edge of the first clock.

15. The semiconductor device of claim 1, further comprising a charge time synchronizing unit configured to synchronize a charge time of the logic level of the feedback output signal with an edge of the first clock when the logic level of the feedback output signal is charged.

16. A semiconductor device, comprising:
a clock inputting unit configured to receive a first clock for synchronizing an address signal and a command signal and a second clock for synchronizing a data signal;
a first phase detecting unit configured to detect a phase of the second clock on the basis of a phase of the first clock, and generate a first detection signal corresponding to a result of the detection;
a second phase detecting unit configured to detect a phase of a delayed clock, which is generated by delaying the second clock by a predetermined time, on the basis of the phase of the first clock, and generate a second detection signal corresponding to a result of the detection;
a logic level determining unit configured to determine a logic level of a majority determination signal according to the first detection signal, the second detection signal and a training information signal;
a training information signal outputting unit configured to output the majority determination signal as the training information signal according to the first clock; and
a signal transmitting unit configured to transmit the training information signal to the outside.

17. The semiconductor device of claim 16, wherein when at least two signals of the first detection signal, the second detection signal and the training information signal have the same logic level and the training information signal is not comprised in the at least two signals, the logic level determining unit charges the logic level of the majority determination signal.

18. The semiconductor device of claim 16, wherein when at least two signals of the first detection signal, the second detection signal and the training information signal have the same logic level and the training information signal is comprised in the at least two signals, the logic level determining unit does not charge the logic level of the majority determination signal.

19. The semiconductor device of claim 16, wherein when at least two signals of the first detection signal, the second detection signal and the training information signal are deactivated, the logic level determining unit deactivates the majority determination signal.

20. The semiconductor device of claim 19, wherein when one of the first detection signal and the second detection signal is activated, the other is deactivated and the training information signal is deactivated, the logic level determining unit maintains a deactivation state of the training information signal without charging a logic level of the majority determination signal in a case where a logic level of the first detection signal or a logic level of the second detection signal is charged so that all the first and second detection signals are deactivated.

21. The semiconductor device of claim 19, wherein when one of the first detection signal and the second detection signal is activated, the other is deactivated and the training information signal is activated, the logic level determining unit charges the logic level of the majority determination signal to deactivate the training information signal in a case where a logic level of the first detection signal or a logic level of the second detection signal is charged so that all the first and second detection signals are deactivated.

22. The semiconductor device of claim 16, wherein when at least two signals of the first detection signal, the second detection signal and the training information signal are activated, the logic level determining unit activates the majority determination signal.

23. The semiconductor device of claim 22, wherein when one of the first detection signal and the second detection signal is activated, the other is deactivated and the training information signal is deactivated, the logic level determining unit charges the logic level of the majority determination signal to activate the training information signal in a case where a logic level of the first detection signal or a logic level of the second detection signal is charged so that all the first and second detection signals are activated.

24. The semiconductor device of claim 22, wherein when one of the first detection signal and the second detection signal is activated, the other is deactivated and the training information signal is activated, the logic level determining unit maintains an activation state of the training information signal without charging the logic level of the majority determination signal in a case where a logic level of the first detection signal or a logic level of the second detection signal is charged so that all the first and second detection signals are activated.

25. The semiconductor device of claim 16, wherein the first phase detecting unit activates the first detection signal when the second clock is activated at an edge of the first clock, and deactivates the first detection signal when the second clock is deactivated at the edge of the first clock.

26. The semiconductor device of claim 16, wherein the second phase detecting unit activates the second detection signal when the delayed clock is activated at an edge of the first clock, and deactivates the second detection signal when the delayed clock is deactivated at the edge of the first clock.

27. A semiconductor device, comprising:
a clock inputting unit configured to receive a first clock for synchronizing an address signal and a command signal and a second clock for synchronizing a data signal;
a frequency converting unit configured to convert a frequency of the second clock in order for the second clock to have the same frequency as a frequency of the first clock;
a first phase detecting unit configured to detect a phase of a clock outputted from the frequency converting unit on the basis of a phase of the first clock, and generate a first detection signal corresponding to a result of the detection;
a second phase detecting unit configured to detect a phase of a delayed clock, which is generated by delaying the clock outputted from the frequency converting unit by a predetermined time, on the basis of the phase of the first clock, and generate a second detection signal corresponding to a result of the detection;
a logic level determining unit configured to determine a logic level of a majority determination signal according to the first detection signal, the second detection signal and a training information signal;
a training information signal outputting unit configured to output the majority determination signal as the training information signal according to the first clock; and
a signal transmitting unit configured to transmit the training information signal to the outside.

28. The semiconductor device of claim 27, wherein when at least two signals of the first detection signal, the second detection signal and the training information signal have the same logic level, and the training information signal is not comprised in the at least two signals, the logic level determining unit charges the logic level of the majority determination signal; and
when at least two signals of the first detection signal, the second detection signal and the training information signal have the same logic level and the training information signal is comprised in the at least two signals, the logic level determining unit does not charge the logic level of the majority determination signal.

29. The semiconductor device of claim 27, wherein when at least two signals of the first detection signal, the second detection signal and the training information signal are deactivated, the logic level determining unit deactivates the majority determination signal.

30. The semiconductor device of claim 29, wherein when one of the first detection signal and the second detection signal is activated, the other is deactivated and the training information signal is deactivated, the logic level determining unit maintains a deactivation state of the training information signal without charging a logic level of the majority determination signal in a case where a logic level of the first detection signal or a logic level of the second detection signal is charged so that all the first and second detection signals are deactivated.

31. The semiconductor device of claim 29, wherein when one of the first detection signal and the second detection signal is activated, the other is deactivated and the training information signal is activated, the logic level determining unit charges the logic level of the majority determination signal to deactivate the training information signal in a case where a logic level of the first detection signal or a logic level of the second detection signal is charged so that all the first and second detection signals are deactivated.

32. The semiconductor device of claim 27, wherein when at least two signals of the first detection signal, the second detection signal and the training information signal are activated, the logic level determining unit activates the majority determination signal.

33. The semiconductor device of claim 32, wherein when one of the first detection signal and the second detection signal is activated, the other is deactivated and the training information signal is deactivated, the logic level determining unit charges the logic level of the majority determination signal to activate the training information signal in a case where a logic level of the first detection signal or a logic level of the second detection signal is charged so that all the first and second detection signals are activated.

34. The semiconductor device of claim 32, wherein when one of the first detection signal and the second detection signal is activated, the other is deactivated and the training information signal is activated, the logic level determining unit maintains an activation state of the training information signal without charging the logic level of the majority determination signal in a case where a logic level of the first detection signal or a logic level of the second detection signal is charged so that all the first and second detection signals are activated.

35. The semiconductor device of claim 27, wherein the first phase detecting unit activates the first detection signal when the clock output from the frequency converting unit is activated at an edge of the first clock, and deactivates the first detection signal when the clock output from the frequency converting unit is deactivated at the edge of the first clock.

36. The semiconductor device of claim 27, wherein the second phase detecting unit activates the second detection signal when the delayed clock is activated at an edge of the first clock, and deactivates the second detection signal when the delayed clock is deactivated at the edge of the first clock.

* * * * *